United States Patent
Brandwine et al.

(10) Patent No.: US 9,875,174 B1
(45) Date of Patent: Jan. 23, 2018

(54) OPTIMIZING THE EXECUTION OF AN APPLICATION EXECUTING ON A PROGRAMMABLE EXECUTION SERVICE

(75) Inventors: Eric J. Brandwine, Haymarket, VA (US); Joseph E. Fitzgerald, Seattle, WA (US); Marvin M. Theimer, Bellevue, WA (US); Benjamin W. Mercier, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 133 days.

(21) Appl. No.: 13/238,867

(22) Filed: Sep. 21, 2011

(51) Int. Cl.
G06F 9/44 (2006.01)
G06F 11/36 (2006.01)
G06F 9/50 (2006.01)

(52) U.S. Cl.
CPC ...... G06F 11/3664 (2013.01); G06F 11/3688 (2013.01); *G06F 9/5077* (2013.01); *G06F 2201/865* (2013.01)

(58) Field of Classification Search
CPC ............. G06F 11/1433; G06F 11/3688; G06F 11/302; G06Q 10/06; G06Q 30/04
USPC ..... 705/7; 709/221, 224; 717/124, 134, 121, 717/128, 153; 718/1, 104, 102; 370/389; 715/734; 714/38.1; 703/13
See application file for complete search history.

(56) References Cited

U.S. PATENT DOCUMENTS

| | | | |
|---|---|---|---|
| 6,970,924 B1 * | 11/2005 | Chu et al. ..................... 709/224 |
| 6,981,180 B1 * | 12/2005 | Bailey et al. .............. 714/38.11 |
| 7,757,214 B1 * | 7/2010 | Palczak et al. ............... 717/121 |
| 8,250,538 B2 * | 8/2012 | Kashyap et al. .............. 717/124 |
| 8,260,603 B2 * | 9/2012 | Cherkasova ........ G06F 11/3447 703/23 |
| 8,615,589 B1 * | 12/2013 | Adogla ................. G06F 9/5077 709/226 |
| 8,756,307 B1 * | 6/2014 | Chen ................... G06F 11/3414 709/223 |
| 8,799,896 B2 * | 8/2014 | Shigeta ............... G06F 11/2247 709/217 |
| 9,058,423 B1 * | 6/2015 | Stone .................. G06F 11/3664 |

(Continued)

OTHER PUBLICATIONS

Vaquero, Luis M. et al., Dynamically Scaling Applications in the Cloud, Jan. 2011, ACM SIGCOMM.*

(Continued)

*Primary Examiner* — Lewis A Bullock, Jr.
*Assistant Examiner* — Gilles Kepnang
(74) *Attorney, Agent, or Firm* — Lee & Hayes, PLLC (57) ABSTRACT

A test environment is created for optimizing the execution of a programmable execution service ("PES") application. The test environment is created in one embodiment by replicating a production network and one or more production virtual machine instances executing the PES application. Once the test environment has been created, the test environment is utilized to identify optimized values for one or more application parameters consumed by the PES application. The optimized values may be selected to optimize the output of a fitness function that is based upon one or more direct and/or indirect performance metrics associated with the PES application. Once the optimized values for the application parameters have been identified, the generated values are applied to production virtual machine instances executing the PES application.

17 Claims, 6 Drawing Sheets

(56) References Cited

U.S. PATENT DOCUMENTS

| | | | |
|---|---|---|---|
| 9,110,496 B1* | 8/2015 | Michelsen | G06F 1/00 |
| 2002/0152305 A1* | 10/2002 | Jackson et al. | 709/224 |
| 2003/0112800 A1* | 6/2003 | Grech et al. | 370/389 |
| 2004/0015600 A1* | 1/2004 | Tiwary et al. | 709/234 |
| 2005/0066310 A1* | 3/2005 | Creamer | G06F 11/362 717/127 |
| 2006/0025984 A1* | 2/2006 | Papaefstathiou | G06Q 10/10 703/22 |
| 2006/0074618 A1* | 4/2006 | Miller et al. | 703/13 |
| 2006/0090136 A1* | 4/2006 | Miller et al. | 715/734 |
| 2007/0028217 A1* | 2/2007 | Mishra | G06F 11/3688 717/124 |
| 2007/0283314 A1* | 12/2007 | Browning | G06F 11/1433 717/100 |
| 2008/0021873 A1* | 1/2008 | Agrawal | G06F 9/5044 |
| 2008/0127084 A1* | 5/2008 | Sattler et al. | 717/121 |
| 2008/0134178 A1* | 6/2008 | Fitzgerald | G06F 9/45537 718/1 |
| 2008/0271019 A1* | 10/2008 | Stratton et al. | 718/1 |
| 2008/0271025 A1* | 10/2008 | Gross et al. | 718/102 |
| 2009/0037824 A1* | 2/2009 | Vedula | G06F 11/3051 715/736 |
| 2009/0055834 A1* | 2/2009 | Ding | G06F 9/5077 718/104 |
| 2009/0150885 A1* | 6/2009 | Safari et al. | 718/1 |
| 2009/0319647 A1* | 12/2009 | White et al. | 709/221 |
| 2010/0082321 A1* | 4/2010 | Cherkasova | G06F 11/3447 703/22 |
| 2010/0125477 A1* | 5/2010 | Mousseau et al. | 705/7 |
| 2010/0174811 A1* | 7/2010 | Musiri et al. | 709/223 |
| 2010/0199130 A1* | 8/2010 | Rolia | G06F 11/3688 714/37 |
| 2010/0199267 A1* | 8/2010 | Rolia | G06Q 10/06 717/135 |
| 2010/0257513 A1* | 10/2010 | Thirumalai et al. | 717/134 |
| 2011/0010691 A1* | 1/2011 | Lu | G06F 11/3688 717/124 |
| 2011/0088022 A1* | 4/2011 | Kruglick | 717/153 |
| 2011/0093852 A1* | 4/2011 | Li | G06F 9/5066 718/100 |
| 2011/0202925 A1* | 8/2011 | Banerjee | G06F 9/5011 718/104 |
| 2011/0307899 A1* | 12/2011 | Lee et al. | 718/104 |
| 2012/0047492 A1* | 2/2012 | Huang et al. | 717/128 |
| 2012/0060146 A1* | 3/2012 | Maurer | G06F 9/45504 717/110 |
| 2012/0233315 A1* | 9/2012 | Hoffman | G06F 9/5072 709/224 |
| 2012/0272234 A1* | 10/2012 | Kaiser | G06F 11/3442 718/1 |
| 2012/0310618 A1* | 12/2012 | B'Far | G06F 11/302 703/13 |
| 2012/0330711 A1* | 12/2012 | Jain | G06Q 30/04 705/7.23 |
| 2013/0054220 A1* | 2/2013 | Gupta | G06F 11/3006 703/22 |
| 2014/0068599 A1* | 3/2014 | Kannan | G06F 8/61 718/1 |

OTHER PUBLICATIONS

Kundu, Sajib, et al. "Application performance modeling in a virtualized environment." 2010. High Performance Computer Architecture (HPCA), 2010 IEEE 16th International Symposium.*

* cited by examiner

OPTIMIZING THE EXECUTION OF AN APPLICATION EXECUTING ON A PROGRAMMABLE EXECUTION SERVICE

BACKGROUND

A programmable execution service ("PES") can provide computing resources for executing distributed applications on a permanent or an as-needed basis. The computing resources provided by a PES may include various types of resources, such as data processing resources, data storage resources, data communication resources, and the like. Each type of computing resource may be general-purpose or may be available in a number of specific configurations. For example, data processing resources may be available as virtual machine instances ("instances"). The instances may be configured to execute all or a portion of a distributed application, including World Wide Web ("Web") servers, application servers, media servers, database servers, support services, and the like. The resources provided by a PES can often be purchased and utilized according to various financial models.

Distributed applications that execute within a PES can be highly complex. For instance, it is not uncommon for such applications to be configured to execute many hundreds of different types of services on a thousand or more instances. As a result of this complexity it can be very difficult to optimize the execution of a PES application. Additionally, many PES applications provide functionality for which high-availability is critical. For example, a PES application might be configured to provide an e-commerce Web site that must operate with very little or no downtime. It can be difficult to optimize the execution of a high-availability PES application because optimization often involves experimentation. The possibility of downtime that might be caused by such experimentation typically outweighs the possible benefits that might be achieved from optimizing the execution of the PES application. As a result, the execution of some types of PES applications is not optimized.

It is with respect to these and other considerations that the disclosure made herein is presented.

DETAILED DESCRIPTION

The following detailed description is directed to technologies for optimizing the execution of a PES application. Utilizing the technologies described herein, the execution of PES applications, including high-availability PES applications, can be optimized to improve performance, reduce resource consumption, and/or to achieve other business related goals. Additionally, the execution of high-availability PES applications can be optimized utilizing the mechanisms disclosed herein with greatly reduced risk of application downtime.

According to one aspect disclosed herein, a PES platform is configured to provide instances of computing resources for executing an application (a "PES application"). For example, the PES platform might provide virtual machine instances ("instances") for executing an application, such as an e-commerce application or another type of distributed application. Software components that implement the PES application are deployed to the virtual machine instances provided by the PES platform. As discussed above, PES applications might be implemented by many different components executing on many different instances.

The PES application is configured to utilize parameters (referred to herein as "application parameters") that control various aspects of the operation of the PES application. For instance, an administrator of the PES application might specify values for the application parameters to configure aspects of the operation of a PES application such as, without limitation, the number of listener processes on a host, cache memory size, timeout values, central processing unit ("CPU") utilization, memory usage, acceptable error rates, and others.

The PES platform is also provided with functionality for optimizing the execution of an application executing on the PES platform. In particular, the PES platform includes an optimization component in one embodiment that is configured to optimize the execution of a PES application. In order to optimize the execution of a PES application, the optimization component is configured to identify and/or create a test environment that is utilized to optimize the execution of the PES application. The optimization component uses the test environment to generate optimized values for the application parameters utilized by the PES application.

In one embodiment, the optimization component or another component creates a test environment by programmatically replicating a production network and production instances executing the PES application. A production network is a network that is receiving live network traffic destined for the production instances. For instance, in the case of an e-commerce application, the production network receives actual network traffic from customers of the e-commerce application. By programmatically replicating the production network, a replicated network is created under software control that receives a copy of the traffic received by the production network. An instance is a production instance while its primary function is to act according to the design of the PES application. For example, a production instance might handle the live network traffic received on the production network.

Other resources utilized by the PES application, such as database resources, might also be replicated. In this manner, a copy of the application and its dependent resources, including incoming network traffic, is created. By performing optimization processes on the replicated instances, the possibility of downtime to the production instances is eliminated.

According to another embodiment, the test environment includes a production network and production instances. As mentioned above, the production network and instances receive live incoming network traffic. Consequently, performing optimization processes on production instances might result in downtime to the production instances. As a result, the optimization processes described herein might be performed incrementally when production instances are utilized in the test environment. For example, the optimization processes described herein might be initially performed on a relatively small number of instances. If the optimization processes are successful, the optimization processes might be expanded to include a greater number of instances. If the optimization processes are unsuccessful, any changes to the production instances might be rolled back and further optimization might be discontinued.

In another embodiment, the test environment includes a test network and test instances. An instance is a test instance while its primary function is to perform optimization processes on the PES application. The test network is also created for performing optimization processes on the PES application. Live network traffic received on a production network might be recorded and replayed on the test network to simulate actual network traffic to the test instances. The test network may be utilized to simulate a high network traffic load, network partition, high packet loss or other stressful scenarios, or an outage of a portion of a fleet. Various permutations of application parameters can then be tested during these types of simulations to determine how the PES application responds. As with the replicated network and instances described above, the test network and instances do not receive actual live network traffic and, therefore, there is no risk of downtime to a production PES application as a result of optimization processes performed on the test network and test instances.

In view of the above, it should be appreciated that a production instance might also be a test instance, or become a test instance temporarily. It should also be appreciated that the terms "replicated" or "replicate" as utilized herein encompass not only cloning an instance, but also repurposing an instance. For example, a production instance might be temporarily utilized as a test instance. In this example, the production instance is considered a test instance because it no longer receives live customer network traffic and because the instance is being utilized to optimize the operation of a PES application.

After the optimization processes described herein have completed, test instances might also be repurposed into production instances. In this manner, optimized application parameters can be "deployed" to the PES application by converted test instances into production instances that handle live network traffic. In this regard, it should be appreciated that, as used herein, the phrase "applying optimized values" includes the conversion of a test instance into a production instance utilized by a PES application.

Once an appropriate test environment has been created, the optimization component utilizes the test environment to generate optimized values for the application parameters utilized by the PES application. In this regard, the optimization component utilizes one or more fitness functions in one embodiment to identify the optimized values for the application parameters. Fitness functions may be based upon one or more one or more direct performance metrics and/or one or more indirect performance metrics. For instance, a fitness function might be based upon metrics such as request latency, network bandwidth reduction, resource usage costs, throughput, cache hit rate, and/or other metrics or combinations of direct and indirect metrics.

Direct performance metrics are metrics that can be directly measured at an instance. For instance, direct performance metrics might include CPU or network utilization, memory usage, or response latency of an instance. Direct performance metrics may correlate strongly to the modification of application parameters at an instance.

Indirect performance metrics are metrics that reflect aspects of the overall operation of a PES application, which may include the operation of many different components on many different instances. For example, indirect performance metrics might include business metrics like the gross volume of orders received by an e-commerce PES application. Indirect performance metrics may correlate weakly to the modification of application parameters at one or more instances.

In order to identify optimized values for the application parameters, the optimization component applies values for the application parameters to instances in the test environment and then measures the impact of the parameter values on the output of the fitness function. If the parameter values have a negative impact on the output of the fitness function, then the parameter values may be discarded. If, however, the parameter values have a positive impact on the output of the fitness function, then the parameter values might be identified as candidate optimized values. The optimization component then modifies the values for the application parameters and repeats the process described above. The optimization component may continue iterating in this fashion until optimized parameter values have been identified or all of the possible parameter values have been attempted.

Once optimized parameter values have been identified, the optimization component may cause the optimized parameter values to be applied to production instances. Additionally, the optimization component might generate an optimization report identifying the optimized values for the application parameters. A system administrator might utilize the report to decide whether the optimized parameter values should be applied to the production instances.

According to one embodiment, the optimization component generates sets of optimized values that include values for multiple parameters. The optimization component then ranks the sets of optimized values according to their improvement of the output of the fitness function. The top-ranked set of parameter values (i.e. the set of parameter values that has the greatest positive impact on the output of the fitness function) might then be applied to the production instances. Sets of optimized values might also be generated for instances of various sizes or groups of instances located in various geographic regions.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
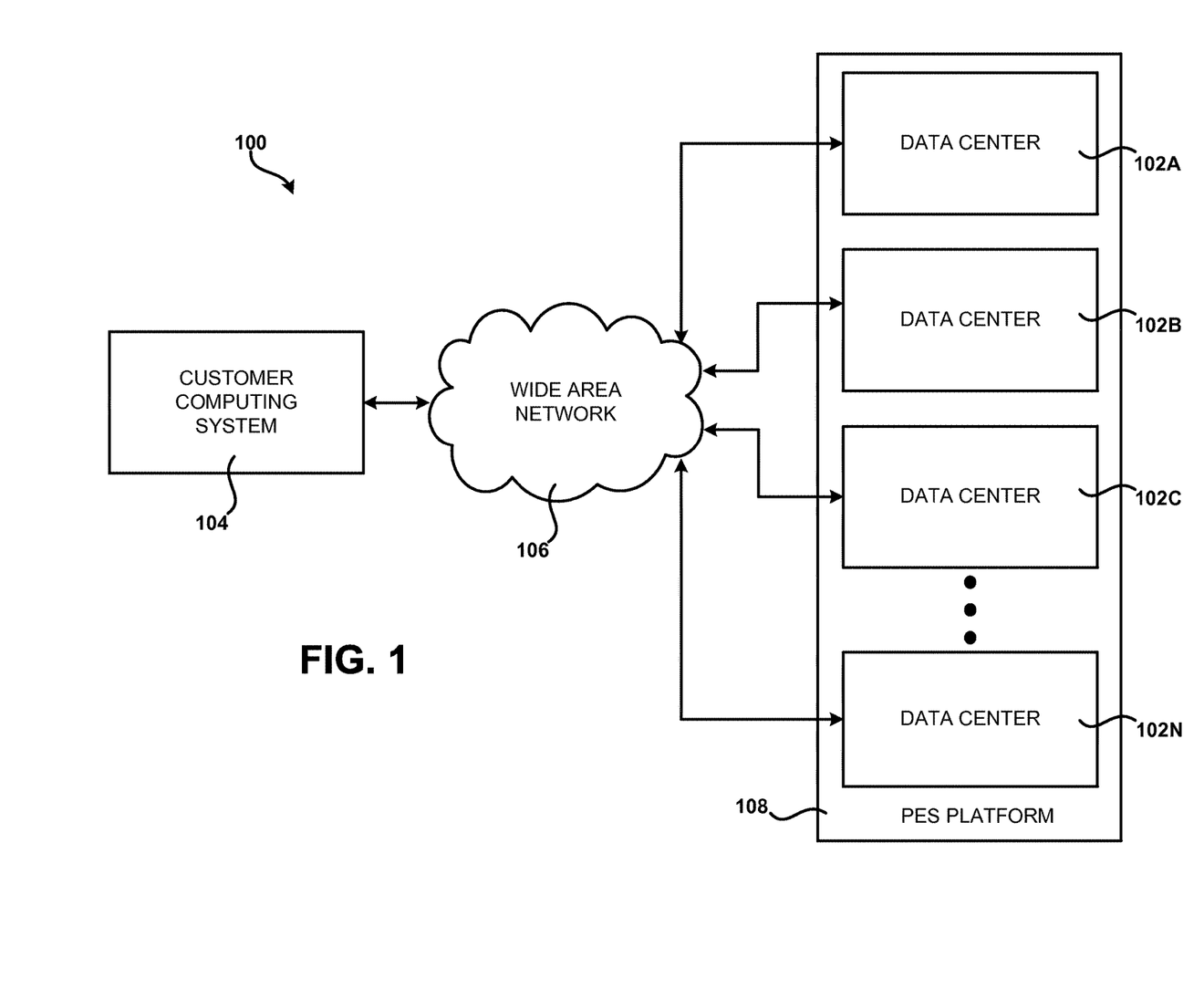
FIG. 1 is a system and network diagram showing aspects of one illustrative operating environment for the embodiments disclosed herein for optimizing the execution of a PES application.

FIG. 1 and the following description are intended to provide a brief, general description of a suitable computing environment in which the embodiments described herein may be implemented. In particular, FIG. 1 is a system and network diagram that shows an illustrative operating environment 100 that includes a PES platform 108 for executing a distributed application.

The PES platform 108 can provide computing resources for executing the application on a permanent or an as-needed basis. The computing resources provided by the PES platform 108 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including Web servers, application servers, media servers, database servers, services, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as Web servers and/or one large processing resource as a database server, for example. As will be described in greater detail below, the optimization procedures described herein might be utilized to create sets of optimized application parameter values for different size instances.

The computing resources provided by the PES platform 108 are enabled by one or more data centers 102A-102N (which may be referred herein singularly as "a data center 102" or in the plural as "the data centers 102"). The data centers 102 are facilities utilized to house and operate computer systems and associated components. The data centers 102 typically include redundant and backup power, communications, cooling, and security systems. The data centers 102 might also be located in geographically disparate locations. One illustrative configuration for a data center 102 that implements the concepts and technologies disclosed herein for optimizing the execution of a PES application will be described below with regard to FIG. 2.

The customers and other consumers of the PES platform 108 may access the computing resources provided by the data centers 102 over a wide-area network ("WAN") 106. Although a WAN is illustrated in FIG. 1, it should be appreciated that a local-area network ("LAN"), the Internet, or any other networking topology known in the art that connects the data centers 102 to remote consumers may be utilized. It should also be appreciated that combinations of such networks might also be utilized.

The customer computing system 104 is a computer utilized by a customer or other consumer of the PES platform 108. For instance, the customer computing system 104 may be a server computer, a desktop or laptop personal computer, a tablet computer, a wireless telephone, a personal digital assistant ("PDA"), an e-reader, a game console, a set-top box, or any other computing device capable of accessing the PES platform 108.

The customer computing system 104 may be utilized to access and configure aspects of the computing resources provided by the PES platform 108. In this regard, the PES platform 108 might provide a Web interface through which aspects of its operation may be configured through the use of a Web browser application program executing on the customer computing system 104. Alternatively, a stand-alone application program executing on the customer computing system 104 might access an application programming interface ("API") exposed by the PES platform 108 for performing the configuration operations. Other mechanisms for configuring the operation of the PES platform 108, including optimizing the execution of an application, might also be utilized.

According to embodiments disclosed herein, the capacity of purchased computing resources provided by the PES platform 108 can be scaled in response to demand. In this regard, scaling refers to the process of instantiating (which may also be referred to as "launching" or "creating") or terminating (which may also be referred to as "de-scaling") instances of computing resources in response to demand. In this manner, the capacity of resources purchased by a customer of the PES platform 108 can be scaled on-demand.

Auto scaling is one mechanism for scaling computing resources in response to increases or lulls in demand for the resources. Auto scaling allows customers of the PES platform 108 to configure the platform 108 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand.

The PES platform 108 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, provide cache warming logic specifying how an application cache should be prepared, and other types of information. The deployment component utilizes the customer-provided configuration and cache warming logic to launch, configure, and prime new instances of computing resources.

The PES platform 108 might also be configured with an optimization component for optimizing the execution of an application executing on the PES platform 108. Details regarding the operation of such an optimization component will be provided below with regard to FIGS. 4-5.

Figure 2:
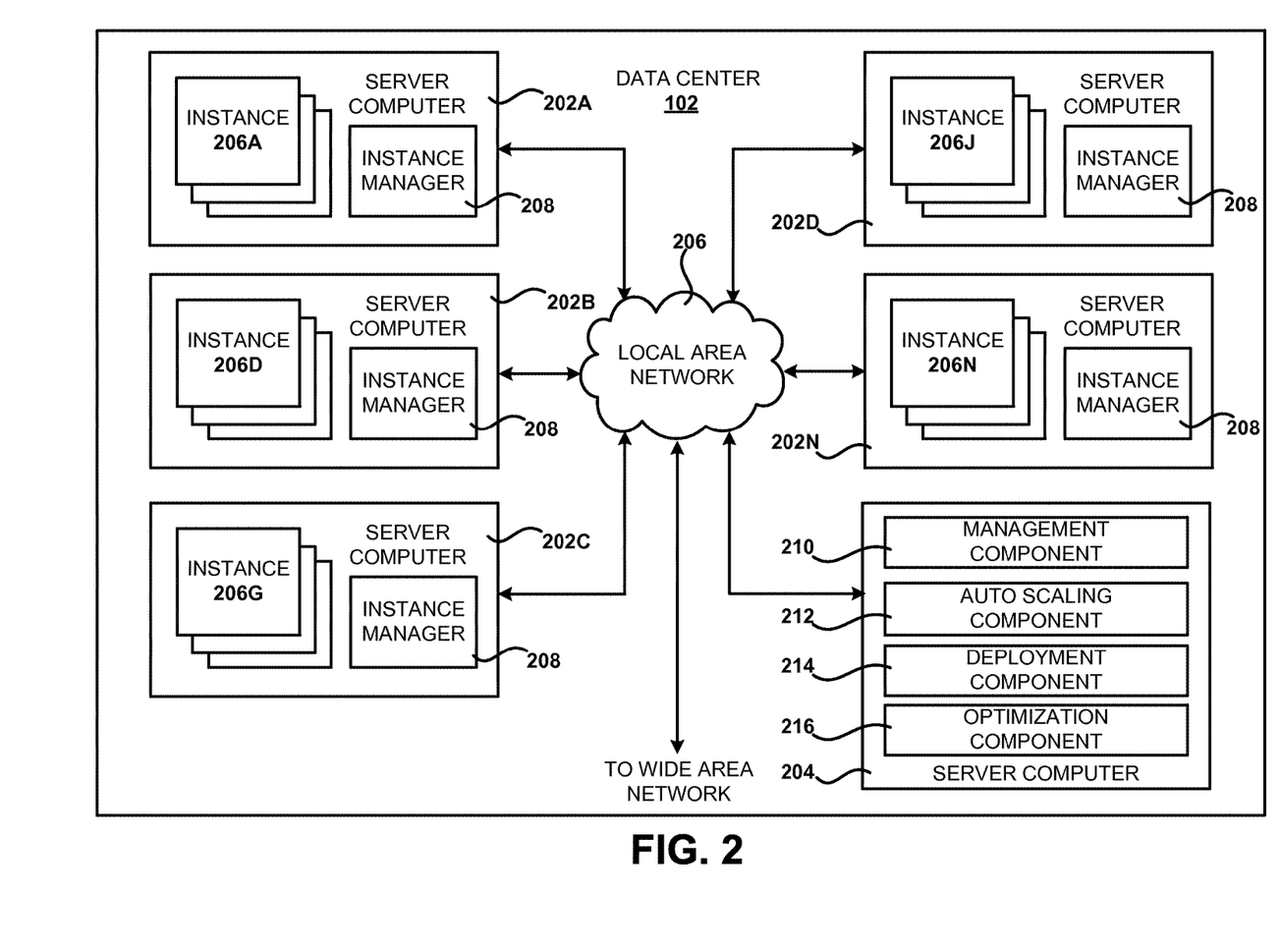
FIG. 2 is a computing system diagram that illustrates a configuration for a data center that implements the concepts and technologies disclosed herein for optimizing the execution of a PES application according to one embodiment.

FIG. 2 is a computing system diagram that illustrates one configuration for a data center 102 that implements a PES platform 108, including an implementation of the concepts and technologies disclosed herein for optimizing the execution of an application executing on the PES platform 108. The example data center 102 shown in FIG. 2 includes several server computers 202A-202N (which may be referred herein singularly as "a server computer 202" or in the plural as "the server computers 202") for providing computing resources for executing an application. The server computers 202 may be standard server computers configured appropriately for providing the computing resources described above. For instance, in one implementation the server computers 202 are configured to provide instances 206A-206N of computing resources.

In one embodiment, the instances 206A-206N (which may be referred herein singularly as "an instance 206" or in the plural as "the instances 206") are virtual machine instances. As known in the art, a virtual machine instance is an instance of a software implementation of a machine (i.e. a computer) that executes programs like a physical machine. In the example of virtual machine instances, each of the servers 202 may be configured to execute an instance manager 208 capable of executing the instances. The instance manager 208 might be a hypervisor or another type of program configured to enable the execution of multiple instances 206 on a single server 202, for example. As discussed above, each of the instances 206 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein might be utilized with instances of storage resources, instances of data communications resources, and with other types of resources. The embodiments disclosed herein might also execute all or a portion of an application directly on a computer system without utilizing virtual machine instances.

The data center 102 shown in FIG. 2 also includes a server computer 204 reserved for executing software components for managing the operation of the data center 102, the server computers 202, and the instances 206. In particular, the server computer 204 might execute a management component 210. As discussed above, a customer of the PES platform 108 might utilize the customer computing system 104 to access the management component 210 to configure various aspects of the operation of PES platform 108 and the instances 206 purchased by the customer. For example, the customer may purchase instances and make changes to the configuration of the instances. The customer might also specify settings regarding how the purchased instances are to be scaled in response to demand. The customer might also indicate that the processes described herein for optimizing a PES application should be performed.

The auto scaling component 212 scales the instances 206 based upon rules defined by a customer of the PES platform 108. For instance, the auto scaling component 212 might allow a customer to specify scale up rules for use in determining when new instances should be instantiated and scale down rules for use in determining when existing instances should be terminated.

As discussed briefly above, the data center 102 is also configured with a deployment component 214 to assist customers in the deployment of new instances 206 of computing resources. The deployment component 214 may receive a configuration from a customer that includes data describing how new instances 206 should be configured. For example, the configuration might specify one or more applications that should be installed in new instances 206, provide scripts and/or other types of code to be executed for configuring new instances 206, provide cache warming logic specifying how an application cache should be prepared, and other types of information.

The optimization component 216 optimizes the execution of an application executing on the PES platform 108. The optimization component 216 may execute on a single server computer 204 or in parallel across multiple server computers 202 in the PES platform 108. In addition, the optimization component 216 may consist of a number of subcomponents executing on different server computers 202 or other computing devices in the PES platform 108. The optimization component 216 may be implemented as software, hardware, or any combination of the two. Additional details regarding the operation of the optimization component 216 will be provided below with regard to FIGS. 4-5.

In the example data center 102 shown in FIG. 2, an appropriate LAN 206 is utilized to interconnect the server computers 202A-202N and the server computer 204. The LAN 206 is also connected to the WAN 106 illustrated in FIG. 1. It should be appreciated that the network topology illustrated in FIGS. 1 and 2 has been greatly simplified and that many more networks and networking devices may be utilized to interconnect the various computing systems disclosed herein. Appropriate load balancing devices or software modules might also be utilized for balancing a load between each of the data centers 102A-102N, between each of the server computers 202A-202N in each data center 102, and between instances 206 purchased by each customer of the PES platform 108. These network topologies and devices should be apparent to those skilled in the art.

It should be appreciated that the data center 102 described in FIG. 2 is merely illustrative and that other implementations might be utilized. In particular, functionality described herein as being performed by the management component 210, the auto scaling component 212, the deployment component 214, and the optimization component 216, might be performed by other components or by a combination of these or other components. Additionally, it should be appreciated that this functionality might be implemented in software, hardware, or a combination of software and hardware. Other implementations should be apparent to those skilled in the art.

Figure 3:
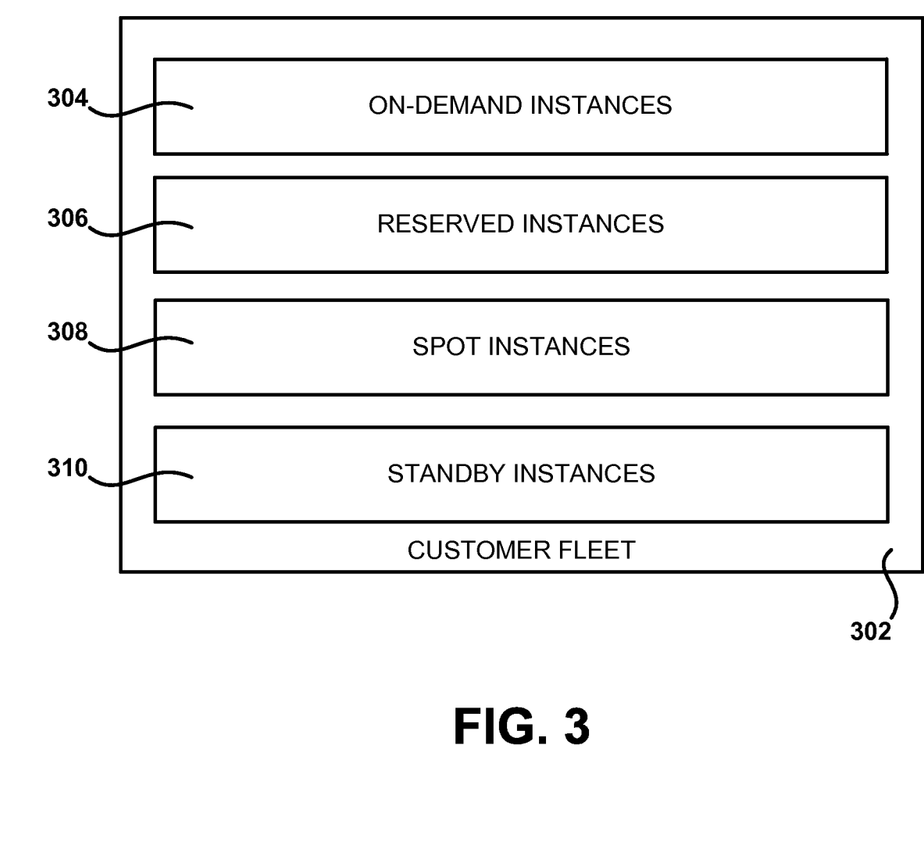
FIG. 3 is a block diagram illustrating various types of instances of computing resources that might be found in a customer fleet utilized to implement a PES application, according to embodiments disclosed herein.

FIG. 3 is a block diagram illustrating several types of instances 206 of computing resources that might be utilized in a customer fleet 302 to implement a PES application, according to embodiments disclosed herein. As used herein, the term "fleet" refers to all of the instances purchased and/or operated by a customer of the PES platform 108. As shown in FIG. 3, the instances provided by the PES platform 108 may be on-demand instances 304, reserved instances 306, spot instances 308, and standby instances 310. Other types of instances not shown in FIG. 3 or described herein might also be provided.

The on-demand instances 304, which might also be referred to herein as "regular" instances, are instances that are paid for and in active use by a customer. The on-demand instances 304 allow customers of the PES platform 108 to pay for capacity per unit of time, such as an instance-hour, without requiring a long-term commitment. This frees the customer from the costs and complexities of planning, purchasing, and maintaining hardware and transforms what are commonly large fixed costs into much smaller variable costs.

The reserved instances 306 are instances of a computing resource that are reserved for a customer in exchange for a payment. The reserved instances 306 provide the customer the option to make a one-time payment for each instance they want to reserve. In turn, the customer may receive a significant discount on the hourly usage charge for the reserved instances 306 as compared to the on-demand instances 304. After the customer makes a one-time payment for the reserved instances 306, the reserved instances 306 are reserved for the customer and the customer has no further obligation. The customer may choose to run the reserved instances 306 for the discounted usage rate for the duration of a chosen term. If the customer does not use the reserved instances 306, the customer will not pay usage charges on these instances.

The spot instances 308 allow customers to bid on unused capacity in the PES platform 108. The customer can run the spot instances 308 for as long as their bid exceeds a current market price, referred to herein as the spot instance market price, which may fluctuate based upon supply and demand. The spot instances 308 may be terminated if a customer's maximum bid no longer exceeds the current spot instance market price.

In order to obtain the spot instances 308, the customer places a request for the spot instances 308 that specifies the desired number of spot instances 308 and the maximum price the customer is willing to pay per instance hour. If the customer's maximum price bid exceeds the current spot instance market price for the spot instances 308, the customer's request will be fulfilled and the customer's spot instances 308 will run until either the customer chooses to terminate them or the market price increases above the customer's maximum price (whichever is sooner). Various components operating within the PES platform 108 may manage the market for the spot instances 308, including setting the current spot instance market price for the spot instances 308.

The standby instances 310 are spot instances 308 that have been acquired on behalf of a customer and that are made ready for near immediate use by the customer in the manner described herein. The price charged for the standby instances 310 is typically less than the price charged for the on-demand instances 304, since the standby instances 310 may be terminated in the same manner as the spot instances 308. In one embodiment, the standby instances 310 are priced higher than the spot instances 308 and the reserved instances 306, but lower than the on-demand instances 304. It should be appreciated, however, that the various pricing mechanisms described above for the on-demand instances 304, reserved instances 306, spot instances 308, and standby instances 310 are merely illustrative and that other mechanisms may be utilized to set the pricing for the various instance types.

Previously it may have been difficult for customers of the PES platform 108 to utilize spot instances 308 because their application might not be optimized for use with various types of spot instances 308 available through the spot market. Through the use of the concepts and technologies disclosed herein, however, a customer of the PES platform 108 might generate sets of optimized application parameter values for many different sizes and types of instances. When spot instances 308 are available from the spot market at a price that is attractive to the customer, the customer can purchase the spot instances 308 and utilize previously generated optimized values corresponding to the purchased spot instances 308 to execute the customer's application in an optimized fashion. In this manner, the technologies disclosed herein might permit greater access to the spot market for certain types of customers of the PES platform 108.

Figure 4:
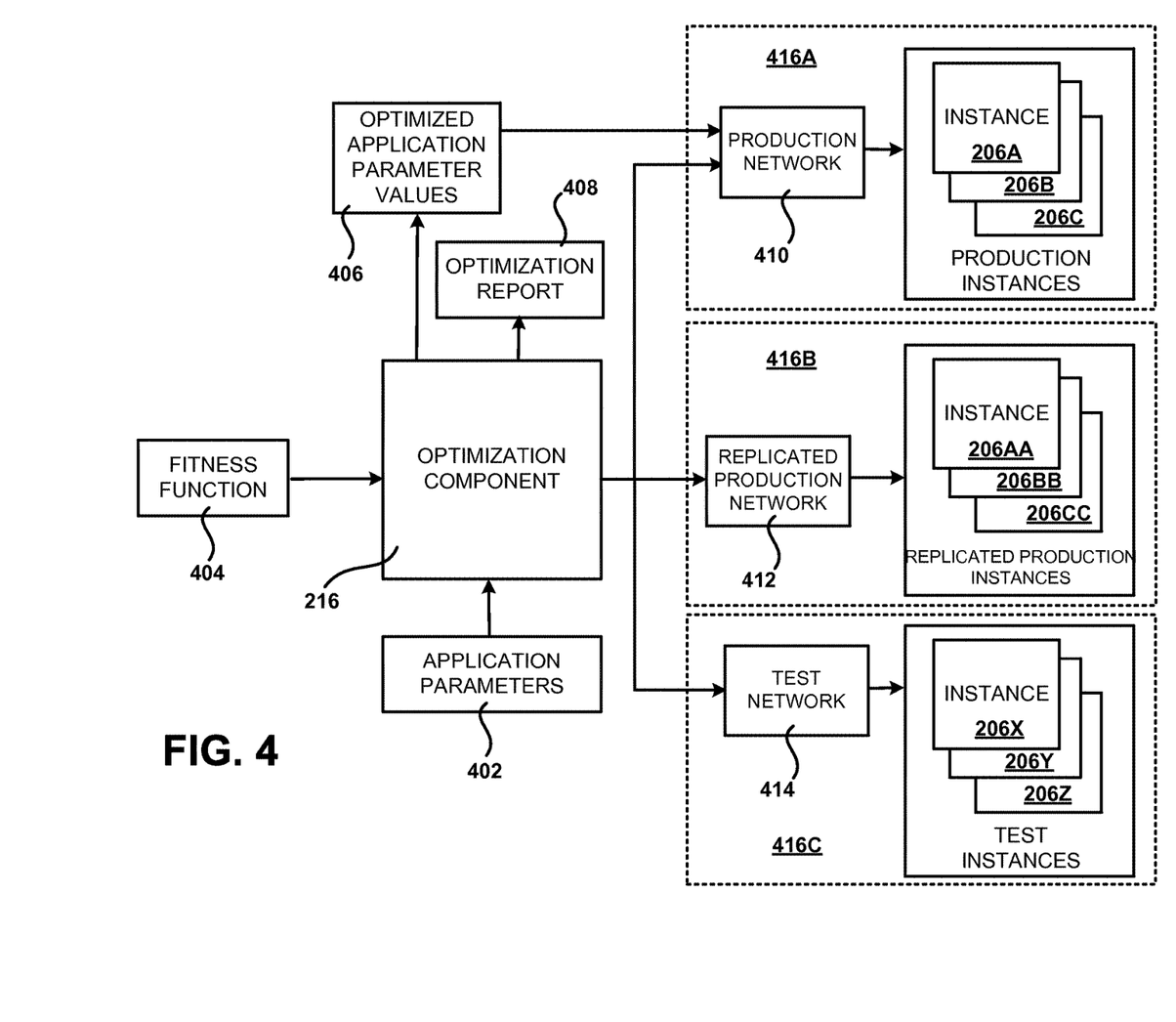
FIG. 4 is a computing system diagram showing aspects of the various embodiments disclosed herein for optimizing the execution of a PES application.

FIG. 4 is a computing system diagram showing aspects of the operation of an optimization component 216 utilized in various embodiments disclosed herein for optimizing the execution of an application within the PES platform 108. As discussed briefly above, the optimization component 216 provides functionality for optimizing the execution of an application executing on the PES platform 108. As also discussed above, the functionality described herein as being performed by the optimization component 216 might be provided by another component or combination of components.

In one embodiment disclosed herein, the optimization component 216 is configured to provide functionality for allowing an owner or maintainer of an application to optimize the execution of an application executing on the PES platform 108. In one embodiment the functionality described herein for optimizing the execution of an application is performed in response to a request from an owner or operator of the application. For instance, a system administrator might provide a request to optimize the execution of the application by way of the management component 210. In other embodiments, the functionality presented herein might be performed in response to other events, like the check-in of source code for an update to the application to a source code management system, the deployment of an update to the application, deployment of new instances by the deployment component 214 or the auto scaling component 212, a change in certain external parameters such as spot instance pricing, a degradation in performance of the application, the addition of new instance types or regions, or in response to other events.

As described briefly above, the PES application that is being optimized is configured to consume one or more application parameters 402 that control various aspects of the operation of the application. For instance, an administrator of the application might specify values for the application parameters to configure aspects of the operation of the application such as the number of listener processes on a host, cache memory size, timeout values, CPU utilization, memory usage, and acceptable error rates. Values for the application parameters 402 might be specified to control other aspects of the operation of the PES application. As will be described in detail below, the optimization component 216 is configured to generate optimized application parameter values 406 (which may be referred to herein as "optimized values") for the application parameters 402 utilized by the PES application. Details of the operation of the optimization component 216 in this regard will be provided below.

In order to generate the optimized application parameter values 406, the optimization component 216 is configured to first create or identify a test environment 416 for performing the optimization processes described herein. In one embodiment, the optimization component 216 creates a test environment 416B by replicating a production network 410 and production instances 206A-206C executing the PES application. As mentioned briefly above, the production network 410 is a network that is receiving live network traffic destined for the production instances 206A-206C. In the case of an e-commerce application, for example, the production network 410 receives actual network traffic from customers of the e-commerce application. The production instances 206A-206C are instances that handle the live network traffic received on the production network 410.

By replicating the production network 410 for use in the test environment 416B, a replicated production network 412 is created that receives a copy of the traffic received by the production network 410. The replicated production instances 206AA-206CC are replicas of the production instances 206A-206C. Other resources utilized by the PES application, such as database resources, might also be replicated. In this manner, the replicated production instances 206AA-206CC receive identical network input to the production instances 206A-206C, and receive identical responses from dependent network resources, but are in fact receiving a copy or "echo" of those responses.

By performing optimization processes on a test environment 416B that includes a replicated production network 412 and replicated production instances 206AA-206CC, the possibility of downtime to the production instances 206A-206C is eliminated. One mechanism for programmatically replicating a network is described in U.S. patent application Ser. No. 12/978,995, which was filed on Dec. 27, 2010, and entitled "Programmatically Provisioning Virtual Networks," which is expressly incorporated herein by reference in its entirety.

According to another embodiment, the optimization component 216 utilizes a test environment 416A that includes a production network 410 and production instances 206A-206C. As mentioned above, the production network 410 and instances 206A-206C receive live incoming network traffic. As a result, performing optimization processes on the production instances 206A-206C might result in downtime to the production instances 206A-206C.

In order to minimize any negative consequences of the processes presented herein on the production instances 206A-206C, the optimization processes described herein might be performed incrementally when a test environment 416A is utilized that includes production instances 206A-206C. For example, the optimization processes described herein might be initially performed on a relatively small number of production instances 206A-206C. If the optimization processes are successful, the optimization processes might be expanded to include a greater number of production instances 206A-206C. If the optimization processes are unsuccessful, any changes to the production instances 206A-206C might be rolled back and further optimization might be discontinued.

In another embodiment, the optimization component utilizes a test environment 416C that includes a test network 414 and test instances 206X-206Z. The test instances 206X-206Z are instances that are created for the purpose of performing optimization processes on the PES application. The test network 414 is also created for performing optimization processes on the PES application. Live network traffic received on the production network 410 might be recorded and replayed on the test network 414 to simulate actual network traffic to the test instances 206X-206Z. As with the replicated network 412 and instances 206AA-206CC described above, the test network 414 and instances 206X-206Z do not receive actual live network traffic and, therefore, there is no risk of downtime to a production PES application as a result of optimization processes performed on the test network 414 and test instances 206X-206Z.

Once the optimization component 216 has created or identified an appropriate test environment 416, the optimization component 216 utilizes the test environment to generate optimized application parameter values 406 for the application parameters 402 utilized by the PES application.

In this regard, the optimization component 216 utilizes one or more fitness functions 404 in one embodiment to identify the optimized application parameter values 406 for the application parameters 402. As mentioned above, a fitness function 404 may be based upon one or more direct performance metrics and/or one or more indirect performance metrics associated with the PES application. For instance, the fitness function 404 might be based upon metrics such as request latency, network bandwidth reduction, resource usage costs, throughput, cache hit rate, and/or other metrics or combinations of metrics. Resource usage costs might include costs associated with processing resources, storage resources, communication resources, third-party resources, and others.

In order to identify the optimized application parameter values 406 for the application parameters 402, the optimization component 216 applies values for the application parameters 402 to instances in the test environment 416 and then measures the impact of the parameter values on the output of the fitness function 404. If the parameter values have a negative impact on the output of the fitness function 404, then the parameter values may be discarded. If, however, the parameter values have a positive impact on the output of the fitness function 404, then the parameter values might be identified as potential optimized application parameter values 406.

The optimization component 216 then modifies the values for the application parameters 402 and repeats the process described above. For instance, a "hill climbing" algorithm is utilized in one embodiment to vary the values of the parameters 402. In other embodiments, a Monte Carlo simulation is utilized to identify the optimized application parameters. Simulated annealing might also be utilized to identify optimized application parameters in other embodiments. In yet other embodiments, a genetic algorithm might be utilized to combine the best-discovered values for different parameters into a set of optimized application parameters that together optimize the performance of the application. Other types of optimization techniques might also be utilized in other embodiments. Additionally, combinations of the optimization techniques described above and other optimization techniques might also be utilized to identify the optimized application parameter values 406.

The optimization component 216 may continue iterating in the manner described above until optimized application parameter values 406 have been identified or the optimization component 216 has exhausted the possible values for the parameters 402 without finding optimal values. In one embodiment, an administrator can specify how the optimization component 216 iterates through values for the application parameters 402. For instance, an administrator might specify a minimum value and a maximum value for a certain application parameter 402. The optimization component 216 may then try values for the application parameter 402 between the specified minimum and maximum values.

In one embodiment, the test environment 416 is destroyed following each test of a set of application parameters and recreated prior to the next iteration of application parameter values. In other embodiments, the test environment 416 is not destroyed between iterations of application parameter values. Rather, in this embodiment, incremental changes may be made to the test environment 416 based upon the particular application parameters that are being tested. For example, if the application parameters relate to fleet size, then instances may be added to or removed from the test environment during each iteration of the test. In this manner, the entire fleet does not need to be destroyed and recreated between each iteration of application parameter values. In another example, components executing on the instances are stopped and restarted with new parameter values during each iteration of the optimization procedure. In general, it should be appreciated that components in the test environment might be incrementally modified during each iteration of the optimization procedure described above based upon the particular application parameters under optimization.

Once the optimization component 216 has identified optimized application parameter values 406, the optimization component 216 may cause the optimized application parameter values 406 to be applied to the production instances 206A-206C. In this manner, the optimization component 216 can utilize a test environment 416B or 416C to perform optimization processes that will not impact the production instances 206A-206C. When the optimized application parameter values 406 have been identified, the optimization component 216 can configure the production instances 206A-206C with the optimized application parameter values 406. As mentioned above, the test instances may also be converted to production instances.

In another embodiment, the optimization component 216 generates an optimization report 408 rather than automatically rolling out the optimized application parameter values 406 to the production instances 206A-206C. The optimization report 308 includes data that identifies the optimized application parameter values 406 for the application parameters 402. The optimization report 408 might also include data indicating the impact that the optimized application parameter values 406 have on the output of the fitness function 404 and/or other information. A system administrator might utilize the optimization report 408 to decide whether the optimized application parameter values 406 should be applied to the production instances 206A-206C.

According to one embodiment, the optimization component 216 generates sets of optimized application parameter values 406 that include values for multiple application parameters 402. The optimization component 216 then ranks the sets of optimized parameter values 406 according to their improvement of the output of the fitness function 404. The top-ranked set of parameter values 406 (i.e. the set of parameter values 406 that has the greatest positive impact on the output of the fitness function 404) might then be applied to the production instances 206A-206C.

In other embodiments, sets of optimized parameter values 406 might also be generated for instances of various sizes or groups of instances located in various geographic regions. In this regard, the optimization component 216 might be configured to create a test environment 416 in a particular geographic location and to perform the optimization processes described herein on the created test environment. In this manner, unique aspects of the geographic region, such as the price of network bandwidth, might be taken into account during the optimization process. Other configurations will be apparent to those skilled in the art.

Figure 5:
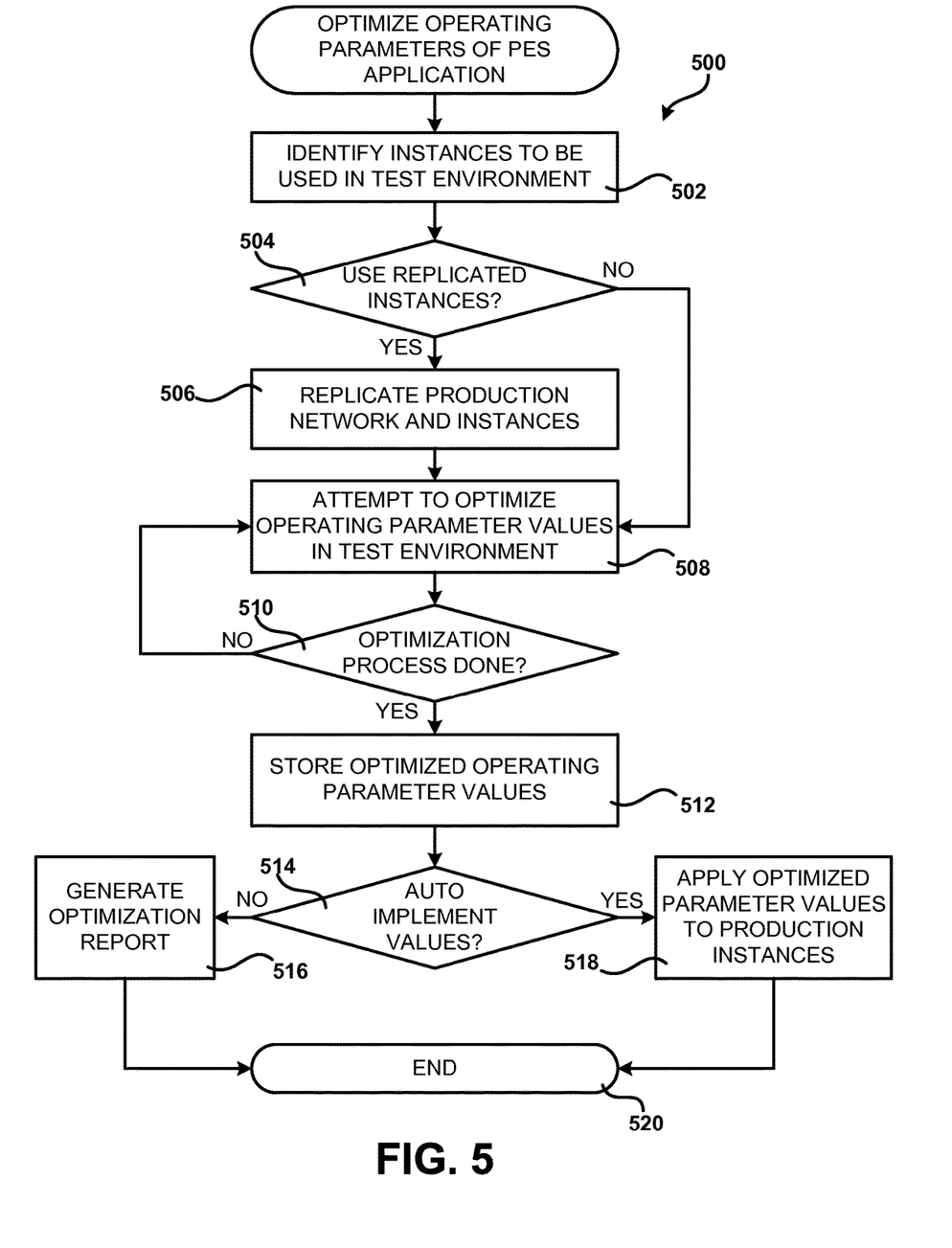
FIG. 5 is a flow diagram showing one illustrative routine for optimizing the execution of a PES application, according to one embodiment disclosed herein.

Turning now to FIG. 5, additional details will be provided regarding one illustrative process disclosed herein for optimizing the execution of an application executing on the PES platform 108. It should be appreciated that the logical operations described herein with respect to FIG. 5 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 5 is a flow diagram showing a routine 500 illustrating aspects of the operation of the optimization component 216 utilized in various embodiments disclosed herein for optimizing the execution of an application executing within the PES platform 108. In one embodiment, the routine 500 is performed by the optimization component 216. It will be appreciated that another module or component may also perform the routine 500, such as the management component 210. A combination of modules and components might also perform the routine 500.

The routine 500 begins at operation 502, where the optimization component 216 determines which instances are to be utilized in the test environment 416. For instance, the optimization component 216 might determine whether production instances 206A-206C, replicated production instances 206AA-206CC, or test instances 206X-206Z are to be utilized. Once the instances to be utilized in the test environment have been identified, the routine 500 proceeds from operation 502 to operation 504.

At operation 504, the optimization component 216 determines whether replicated instances 206AA-206CC are to be utilized in the test environment 416. If so, the routine 500 proceeds to operation 506, where the optimization component 216 causes the production network 410 to be replicated into the replicated production network 412. The optimization component 216 also causes the production instances 206A-206C to be replicated into the replicated production instances 206AA-206CC. In this manner, the test environment 416B is created. This process was described in additional detail above.

From operation 506, the routine 500 proceeds to operation 508 where the optimization component 216 attempts to optimize the values 406 for the application parameters 402. As discussed above, the optimization component 216 might vary values for the application parameters 402 and determine the impact of the values on the output of the fitness function 404. Additional details regarding this process were provided above with regard to FIG. 4.

From operation 508, the routine 500 proceeds to operation 510, where the optimization component 216 determines whether the optimization process has completed. If so, the routine 500 proceeds from operation 510 to operation 512 where the optimization component 216 stores the optimized application parameter values 406. The routine 500 then proceeds to operation 514, where the optimization component 216 determines whether the optimized application parameter values 406 should be applied to the production instances 206A-206C without the involvement of an administrator. An administrator might specify whether the optimized parameters should be automatically applied to the production instances 206A-206C or not.

If the optimized values are to be applied to the production instances 206A-206C, the routine 500 proceeds from operation 514 to operation 518 where the optimized values 406 are applied to the production instances 206A-206C. Otherwise, the routine 500 proceeds from operation 514 to operation 516, where the optimization report 408, described above, is generated and provided to an administrator. From operations 516 and 518, the routine 500 proceeds to operation 520, where it ends.

Figure 6:
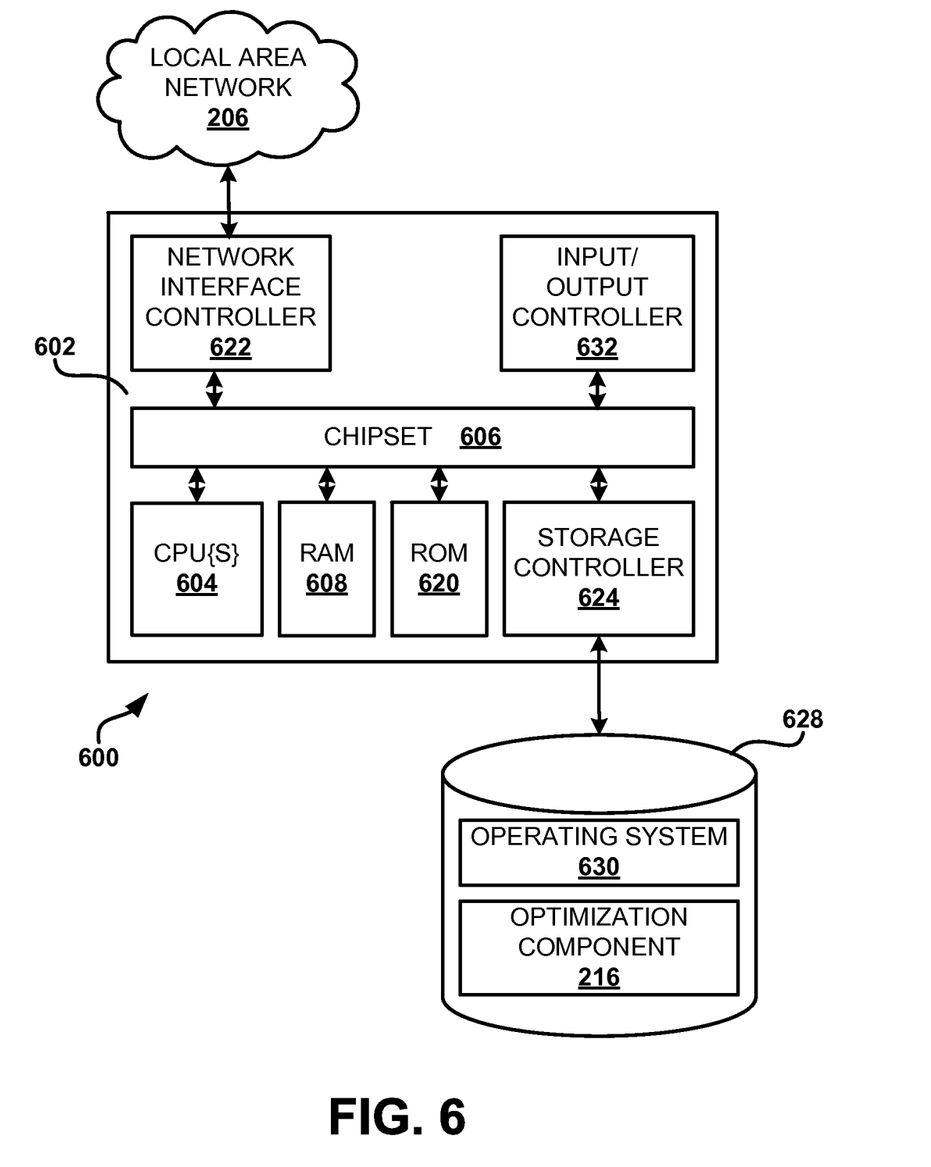
FIG. 6 is a computer architecture diagram showing an illustrative computer hardware architecture for implementing the various computing devices described in embodiments presented herein.

FIG. 6 shows an example computer architecture for a computer 600 capable of executing the software components described above. The computer architecture shown in FIG. 6 illustrates a conventional server computer, workstation, desktop computer, laptop, network appliance, personal digital assistant ("PDA"), e-reader, digital cellular phone, or other computing device, and may be utilized to execute any aspects of the software components presented herein described as executing within the data centers 102A-102N, on the server computers 202A-202N, on the customer computing system 104, or on any other computing system mentioned herein.

The computer 600 includes a baseboard, or "motherboard," which is a printed circuit board to which a multitude of components or devices may be connected by way of a system bus or other electrical communication paths. In one illustrative embodiment, one or more central processing units ("CPUs") 604 operate in conjunction with a chipset 606. The CPUs 604 are standard programmable processors that perform arithmetic and logical operations necessary for the operation of the computer 600.

The CPUs 604 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard. The chipset 606 may provide an interface to a random access memory ("RAM") 608, used as the main memory in the computer 600. The chipset 606 may further provide an interface to a computer-readable storage medium such as a read-only memory ("ROM") 620 or non-volatile RAM ("NVRAM") for storing basic routines that that help to startup the computer 600 and to transfer information between the various components and devices. The ROM 620 or NVRAM may also store other software components necessary for the operation of the computer 600 in accordance with the embodiments described herein.

The computer 600 may operate in a networked environment using logical connections to remote computing devices and computer systems through the network 206. The chipset 606 may include functionality for providing network connectivity through a network interface controller ("NIC") 622, such as a gigabit Ethernet adapter. The NIC 622 is capable of connecting the computer 600 to other computing devices over the network 206. It should be appreciated that multiple NICs 622 may be present in the computer 600, connecting the computer to other types of networks and remote computer systems.

The computer 600 may be connected to a mass storage device 628 that provides non-volatile storage for the computer. The mass storage device 628 may store system programs, application programs, other program modules, and data, which have been described in greater detail herein. The mass storage device 628 may be connected to the computer 600 through a storage controller 624 connected to the chipset 606. The mass storage device 628 may consist of one or more physical storage units. The storage controller 624 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 may store data on the mass storage device 628 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 628 is characterized as primary or secondary storage, and the like.

For example, the computer 600 may store information to the mass storage device 628 by issuing instructions through the storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 may further read information from the mass storage device 628 by detecting the physical states or characteristics of one or more particular locations within the physical storage units.

In addition to the mass storage device 628 described above, the computer 600 may have access to other computer-readable storage medium to store and retrieve information, such as program modules, data structures, or other data. It should be appreciated by those skilled in the art that computer-readable storage media can be any available media that provides for the storage of non-transitory data and that may be accessed by the computer 600.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 628 may store an operating system 630 utilized to control the operation of the computer 600. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 628 may store other system or application programs and data utilized by the computer 600, such as the optimization component 216 and/or the other software components described above.

In one embodiment, the mass storage device 628 or other computer-readable storage media is encoded with computer-executable instructions which, when loaded into the computer 600, transforms the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the routine 500 described above with regard to FIG. 5.

The computer 600 may also include an input/output controller 632 for receiving and processing input from a number of input devices, such as a keyboard, a mouse, a touchpad, a touch screen, an electronic stylus, or other type of input device. Similarly, the input/output controller 632 may provide output to a display, such as a computer monitor, a flat-panel display, a digital projector, a printer, a plotter, or other type of output device. It will be appreciated that the computer 600 may not include all of the components shown in FIG. 6, may include other components that are not explicitly shown in FIG. 6, or may utilize an architecture completely different than that shown in FIG. 6.

Based on the foregoing, it should be appreciated that technologies for optimizing the execution of an application executing within a PES platform 108 have been presented herein. It should be appreciated that although the embodiments disclosed herein have been described in the context of deploying updates to an application, the various aspects described herein might also be utilized to deploy updates to other types of software, such as operating systems. Some of the concepts and technologies described herein might also be applied to new installations of applications.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for optimizing execution of a programmable execution service ("PES") application, the method comprising performing computer-implemented operations for:
   creating a test environment for optimizing the execution of the PES application by programmatically replicating a production network and by replicating one or more production virtual machine instances located within the production network executing the PES application to create a plurality of test virtual machine instances executing the PES application, wherein the test environment receives a copy of network traffic received by the production network;
   generating a plurality of sets of test values for one or more application parameters utilized by the PES application;
   utilizing the plurality of test virtual machine instances in the created test environment and the plurality of sets of test values to determine a plurality of sets of optimized values for the one or more application parameters, the plurality of sets of optimized values determined by:
      applying one of the plurality of sets of test values to the application parameters by updating the test environment according to the one of the plurality of sets of test values,
      measuring an impact of the one of the plurality of sets of test values on an output of one or more fitness functions based upon one or more direct and indirect performance metrics associated with the PES application,
      adding the one of the plurality of sets of test values to the plurality of sets of optimized values based on the measuring indicating a positive impact on the output of the one or more fitness functions,
      discarding the one of the plurality of sets of test values based on the measuring indicating a negative impact on the output of the one or more fitness functions, and
      repeating the applying, the measuring, and one of adding or discarding, without destroying the test environment, until all permutations of the plurality of sets of test values have been measured;
   ranking the plurality of sets of optimized values according to their respective improvement to the one or more fitness functions to determine a top-ranked set of optimized values, the top-ranked set of optimized values having a highest positive impact on the output of the one or more fitness functions; and
   applying the top-ranked set of optimized values to one or more production application parameters of the one or more production virtual machine instances executing the PES application in the production network, wherein the one or more production application parameters include a value for a number of resources utilized by the PES application.

2. The computer-implemented method of claim 1, wherein the plurality of sets of test values are generated for a plurality of virtual machine instance sizes.

3. The computer-implemented method of claim 1, wherein the plurality of sets of test values are generated for virtual machine instances executing in a plurality of geographic regions.

4. A system for optimizing execution of a programmable execution service ("PES") application, the system comprising:
   a plurality of server computers executing the PES application; and
   a computer executing an optimization component configured to optimize the execution of the PES application by
      programmatically replicating a plurality of production instances executing the PES application and resources utilized by the production instances to create a test environment comprising a plurality of test instances executing the PES application, wherein the resources utilized by the production instances comprise a production network and the test environment receives a copy of network traffic received by the production network, generating a plurality of sets of test values for one or more application parameters utilized by the PES application;

utilizing the plurality of sets of test values, the plurality of test instances and resources to determine a plurality of sets of optimized values for the one or more application parameters, wherein determining the plurality of sets of optimized values comprises:

updating the test environment by applying one of the plurality of sets of test values to the one or more application parameters, measuring an impact of the one of the plurality of sets of test values on an output of one or more fitness functions based upon one or more direct and indirect performance metrics associated with the PES application, adding the one of the plurality of sets of test values to the plurality of sets of optimized values based on the measuring indicating a positive impact on the output of the one or more fitness functions, discarding the one of the plurality of sets of test values based on the measuring indicating a negative impact on the output of the one or more fitness functions, and repeating the applying, the measuring, and one of adding or discarding, without destroying the test environment, until all permutations of the plurality of sets of test values have been measured;

ranking the plurality of sets of optimized of values according to their respective improvement to the one or more fitness functions to determine a top-ranked set of optimized values, the top-ranked set of optimized values having a highest positive impact on the output of the one or more fitness functions; and applying the top-ranked set of optimized values to one or more production application parameters of the plurality of production instances executing the PES application in the production network, wherein the one or more production application parameters include a value for a number of resources utilized by the PES application.

5. The system of claim 4, wherein one or more of the application parameters define a number of listener processes utilized by the PES application.

6. The system of claim 4, wherein one or more of the application parameters define an amount of memory that may be utilized by the PES application.

7. A computer-readable storage medium having computer-executable instructions stored thereupon which, when executed by a computer, cause the computer to:

create a test environment for optimizing execution of a programmable execution service ("PES") application by programmatically replicating a plurality of production instances executing the PES application to create a plurality of test instances executing the PES application and by replicating one or more resources utilized by the PES application, wherein the one or more resources utilized by the PES application comprise a production network and the test environment receives a copy of network traffic received by the production network;

generating a plurality of sets of test values for one or more application parameters utilized by the PES application;

utilize the plurality of test instances in the created test environment to generate a plurality of sets of optimized values for the one or more application parameters, wherein generating the plurality of sets of optimized values comprises:

applying one of the plurality of sets of test values to the one or more application parameters by updating the test environment according to the one of the plurality of sets of test values, measuring an impact of the one of the plurality of sets of test values on an output of one or more fitness functions based upon one or more direct and indirect performance metrics associated with the PES application, adding the one of the plurality of sets of test values to the plurality of sets of optimized values based on the measuring indicating a positive impact on the output of the one or more fitness functions, discarding the one of the plurality of sets of test values based on the measuring indicating a negative impact on the output of the one or more fitness functions, and repeating the applying, the measuring, and one of adding or discarding, without destroying the test environment, until all permutations of the plurality of sets of test values have been measured;

rank the plurality of optimized sets of values according to their respective improvement to the one or more fitness functions to determine a top-ranked set of optimized values, the top-ranked set of optimized values having a highest positive impact on the output of the one or more fitness functions; and utilize the top-ranked set of optimized values on one or more production application parameters of one or more production instances executing the PES application in the production network, wherein the one or more production application parameters include a value for a number of resources utilized by the PES application.

8. The computer-readable storage medium of claim 7, wherein the test environment is utilized to simulate a high network traffic load.

9. The computer-readable storage medium of claim 7, wherein the test environment is utilized to simulate packet loss.

10. The computer-readable storage medium of claim 7, wherein the test environment is utilized to simulate an outage of a portion of a fleet of instances utilized to execute the PES application.

11. The computer-readable storage medium of claim 7, having further computer-executable instructions stored thereupon which, when executed by a computer, cause the computer to generate an optimization report identifying the top-ranked set of optimized values.

12. The computer-readable storage medium of claim 7, wherein the one of the plurality of sets of test values is applied based on a hill climbing algorithm, a simulated annealing algorithm, a genetic algorithm, or a combination thereof.

13. The computer-readable storage medium of claim 7, wherein one or more of the application parameters define a fleet size for the PES application.

14. The computer-readable storage medium of claim 7, wherein one or more of the application parameters define a cache memory size for the PES application.

15. The computer-readable storage medium of claim 7, wherein one or more of the application parameters define a central processing unit utilization for the PES application.

16. The computer-readable storage medium of claim 7, wherein the plurality of sets of test values are generated for instances executing in a plurality of geographic regions.

17. The computer-readable storage medium of claim 7, wherein the plurality of sets of test values are generated for a plurality of virtual machine instance sizes.

* * * * *